United States Patent

Hunt

(10) Patent No.: US 9,133,026 B2
(45) Date of Patent: Sep. 15, 2015

(54) ENERGY CONVERSION SYSTEM

(75) Inventor: James D. Hunt, Galesburg, IL (US)

(73) Assignee: HydroGreen Innovations, LLC, West Burlington, IA (US)

(*) Notice: Subject to any disclaimer, the term of this patent is extended or adjusted under 35 U.S.C. 154(b) by 1472 days.

(21) Appl. No.: 12/012,869

(22) Filed: Feb. 6, 2008

(65) Prior Publication Data

US 2008/0193344 A1    Aug. 14, 2008

Related U.S. Application Data

(60) Provisional application No. 60/899,761, filed on Feb. 6, 2007.

(51) Int. Cl.

| B01J 19/08 | (2006.01) |
|---|---|
| B01J 19/12 | (2006.01) |
| C01B 3/04 | (2006.01) |
| C01B 13/02 | (2006.01) |
| F02M 25/12 | (2006.01) |

(52) U.S. Cl.
CPC ............ *C01B 3/042* (2013.01); *C01B 13/0207* (2013.01); *F02M 25/12* (2013.01); *Y02E 60/364* (2013.01); *Y02T 10/121* (2013.01)

(58) Field of Classification Search
CPC .................................. B01J 19/08; B01J 19/12
USPC .............................. 204/242, 278; 422/186.21
See application file for complete search history.

(56) References Cited

U.S. PATENT DOCUMENTS

| 4,196,716 | A | * | 4/1980 | Evans et al. .................... 126/693 |
|---|---|---|---|---|
| 4,816,970 | A | * | 3/1989 | Garcia, Jr. ...................... 362/183 |
| 5,692,459 | A |   | 12/1997 | Richardson, Jr. |
| 5,792,325 | A |   | 8/1998 | Richardson, Jr. |
| 6,113,865 | A |   | 9/2000 | Dammann et al. |
| 6,183,604 | B1 | * | 2/2001 | Santilli ......................... 204/172 |
| 6,540,966 | B1 | * | 4/2003 | Santilli .................... 422/186.21 |
| 6,673,322 | B2 | * | 1/2004 | Santilli .................... 422/186.21 |
| 2006/0144693 | A1 | * | 7/2006 | Villalobos ..................... 204/165 |
| 2008/0053514 | A1 | * | 3/2008 | Micallef ....................... 136/248 |
| 2008/0155985 | A1 | * | 7/2008 | Labrador ........................ 60/698 |

FOREIGN PATENT DOCUMENTS

WO  PCT/US2008/053165    8/2009

\* cited by examiner

*Primary Examiner* — Zulmariam Mendez
(74) *Attorney, Agent, or Firm* — Hamilton IP Law, PC; Jay R. Hamilton; Charles A. Damschen

(57) ABSTRACT

An energy conversion system includes a water-containing vessel with a transparent sidewall. Energized carbon rods are fed into the vessel such that the carbon rods are immersed in the water. The carbon rods are juxtaposed sufficiently that electrical arcing occurs between them, causing decomposition of some water molecules into constituent hydrogen and oxygen gas. Photon emissions resulting from the arcing are collected by photovoltaic cells placed around the sidewall of the vessel. The hydrogen gas is cooled by passing it through a water reservoir which also provides a source for water in the vessel. The cooled hydrogen gas may be used to fuel an internal combustion engine. Byproduct heat from the arcing reaction may be utilized in a Stirling engine or radiated from the system. As the carbon rods become depleted during arcing, additional rods are fed through conductive sleeves into the vessel by linear actuators.

12 Claims, 4 Drawing Sheets

ENERGY CONVERSION SYSTEM

CROSS-REFERENCE TO RELATED APPLICATIONS

This application claims priority from provisional patent application entitled "Energy Conversion System"; Ser. No. 60/899,761 filed Feb. 6, 2007. The disclosure of provisional patent application Ser. No. 60/899,761 is hereby incorporated in its entirety.

BACKGROUND OF THE INVENTION

The present invention relates to equipment designed to produce a combustible gas from underwater electrical discharge and more particularly to capturing the different forms of energy created by the hydrolysis of water by underwater arcing. The invention has its origins in the Eldridge patent of 1898 (U.S. Pat. No. 603,058), which discussed a method to generate a combustible gas by use of an electrical arc between two carbon electrodes. Several inventions improved the production of the combustible gas and the reagents used to create the arc. The technology of underwater electric welding via the use of an arc between carbon electrodes to repair ships, was established in the last century. It was then discovered that the gas bubbling to the surface from underwater arcs is combustible.

The arc is generally produced by a power unit, such as a welder, operating at low voltage (25-35 V) and high current (300 A to 3,000 A). The current brings to incandescence the tip of the carbon electrodes which erodes the carbon rods and releases ionized carbon atoms. The arc separates the water into ionized atoms of hydrogen and oxygen. The area surrounding the arc is, therefore, comprised of carbon, hydrogen and oxygen ions. A number of chemical reactions then occur within said area, such as: the formation of the $H_2$ and $O_2$ molecule; the oxidation of $H^+$ into $H_2O$; the oxidation of carbon ions into CO; the combustion of CO and O into $CO_2$; and other reactions. Other byproducts of the process are heat and light.

Although the combustible gas produced does not generate the pollutants of the combustion exhausts of typical fossil fuels such as gasoline and natural gas, certain factors have limited the usefulness of the process. The prior art set out to solve practical problems such as excess production of greenhouse gases and the reaction's rapid consumption of the carbon rods used for the electrodes. One reason for lack of industrial and consumer maturity is the short duration of the carbon electrodes which require replacement and servicing. The short lifetime of the carbon rods typically requires the halting of the operation and replacement of the electrodes often. The replacement of the electrodes made them of little use to both industry and consumer operations. The Santilli patent U.S. Pat. No. 6,183,604 uses an arc system whereby one of the electrodes continuously moves thereby changing the position of the arc. This change in position reduces the amount of carbon dioxide produced in the various chemical reactions inside the reaction chamber. A constant replenishment of carbon rods would facilitate practical operation of the process first described by Eldridge.

SUMMARY OF THE INVENTION

The present invention describes a high efficiency energy conversion system using water and electricity as the source fuels. The disadvantages of previous underwater arcing systems include the degradation of the carbon source and low efficiency. The present invention provides the means to replenish the carbon rods via a magazine as well as the recycling of the degraded carbon rods. Additionally, the invention improves the efficiency of the reaction by collecting the light and heat generated by the reaction and converting those energies to electricity to help sustain the reaction itself.

The present invention provides power in several different forms all stemming from a reaction chamber containing water. The reaction chamber contains an anode and cathode both made of carbon rods. The rods are placed with their tips near one another such that a differential in electrical potential between the anode and the cathode creates an arc between the anode and cathode, resulting in the release of $H_2$ gas, along with other gases. A bank of batteries attached to the electrodes provides the initial electric current. The $H_2$ gas may be provided to an internal combustion engine where the byproducts of the combustion process include water and carbon dioxide. A portion of the water byproduct is routed back to the reaction chamber to partially replenish the water supply.

The second source of energy created by the conversion system is the photon energy produced by the arcing between the cathode and anode located in the reaction chamber. The arcing produces photons which are capable of being captured by solar panels surrounding the reaction chamber. The captured energy is then relayed to the power source, thus contributing to replacement of the electricity potential stored by the bank of batteries.

The third source of energy is the heat generated from the arcing and hydrolysis of the liquid water contained in the reaction chamber. Once the water in the reaction chamber reaches a critical temperature, it is transported to a Stirling engine. The Stirling engine then transforms the heat into mechanical energy which may be used to generate electricity which may assist to replenish the bank of batteries. The now cooled water flows into a carbon particle collection chamber which collects the particles of carbon created by the erosion of the carbon rods located within the reaction chamber. Once filtered, the cooled water returns to the water reservoir to be reused.

It is accordingly an object of the invention to provide an energy conversion system used to power an internal combustion engine.

It is a further object of the invention to provide an energy conversion system capable of aiding in its own replenishment of energy via capturing heat and solar energy produced in the reaction chamber.

It is yet another object of the invention to provide an energy source for an internal combustion engine that will burn cleaner than traditional fossil fuel powered engines.

It is also an object of the invention to provide a system capable of filtering carbon particles from the water in the system for a clean fuel supply and the recycling of the carbon particles.

It is further an object of the invention to provide a continuous supply of carbon for the carbon rods as the ends of the rods erode.

These and other objects of the invention will become apparent from examination of the description and claims which follow.

BRIEF DESCRIPTION OF THE SEVERAL VIEWS OF THE DRAWING(S)

DETAILED DESCRIPTION OF THE INVENTION

Figure 1:
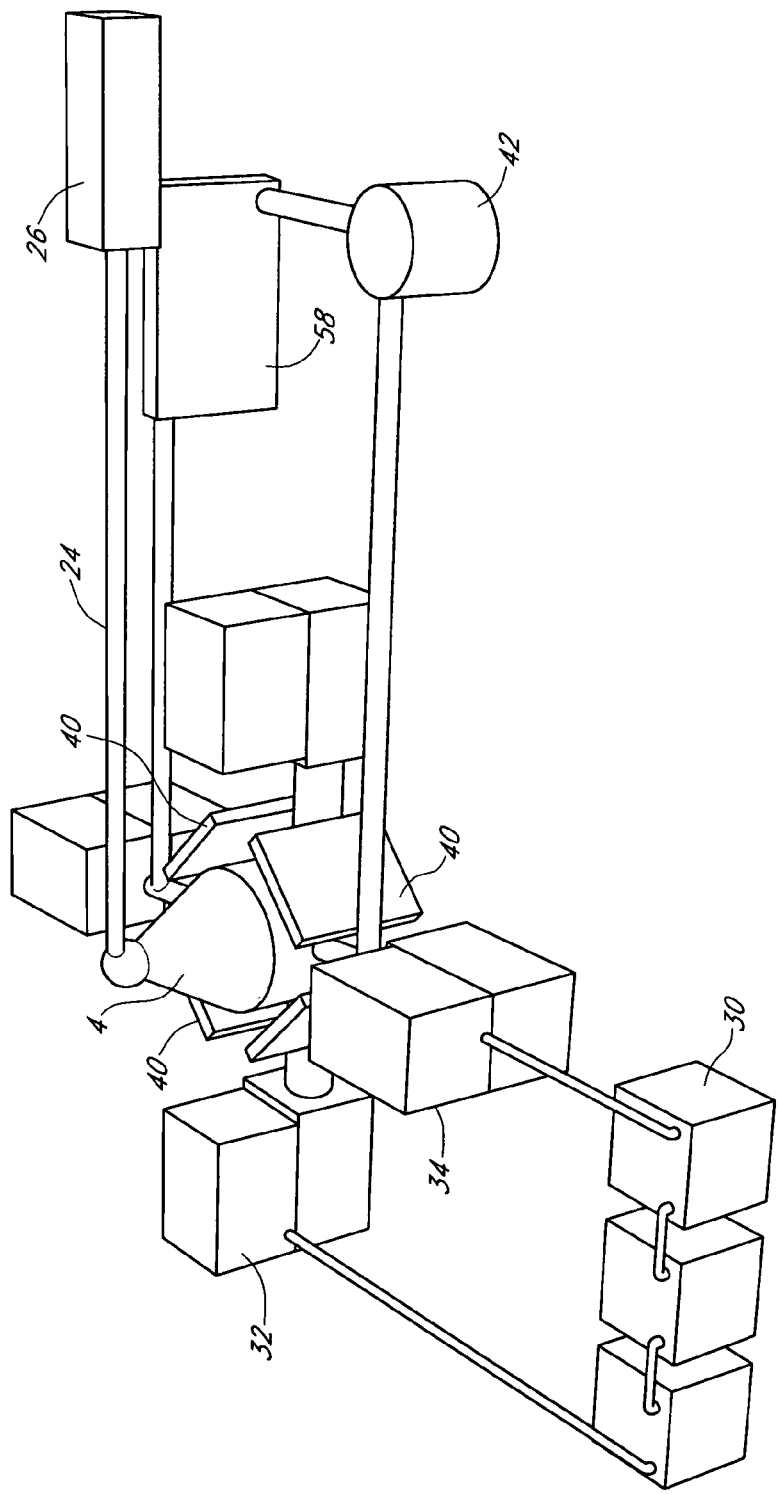
FIG. 1 is a diagrammatic illustration of the invention.
Figure 2:
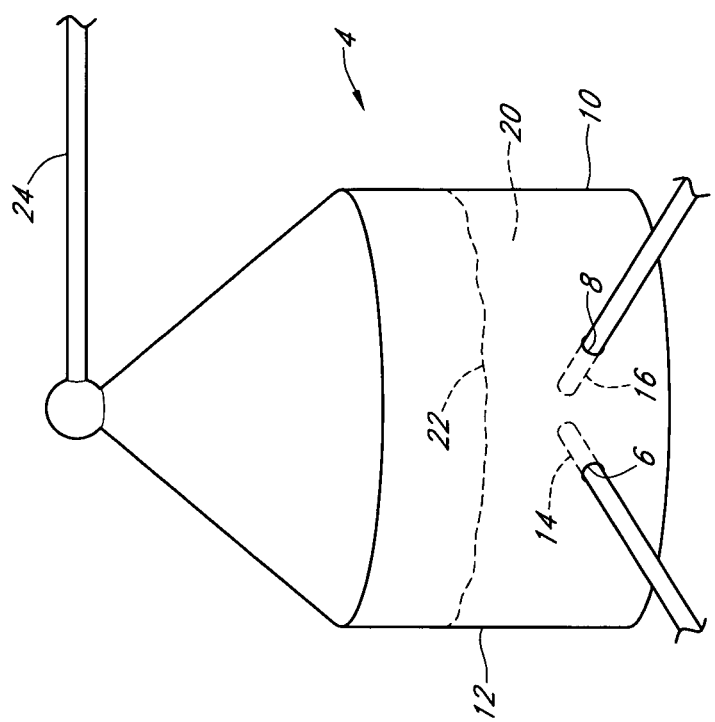
FIG. 2 is a perspective of the reaction chamber of the invention with parts thereof cut away.

Referring to FIGS. 1 and 2, a reaction chamber 4 is provided with a supply of water at a satisfactory level. Ports 6, 8 are provided in the sidewall 10 of the reaction chamber vessel 12 into which carbon electrodes 14 and 16 can be introduced. The carbon electrodes comprise an anode 14 and a cathode 16. As the anode 14 and cathode 16 are brought into proximity while submerged in the water 20, an arc occurs across the gap between the electrodes 14 and 16. As explained in U.S. Pat. No. 6,183,604 to Santilli, the arc causes release of $H_2$ gas, CO gas and $O_2$ gas which bubble to the surface and are collected in the reaction chamber 4 above the water level 22. The collected $H_2$, $O_2$ and CO gases are transferred by way of duct 24 to an injection port 26 of an internal combustion engine (not illustrated) which can use the gases as fuel to produce mechanical power.

Potential between electrodes 14 and 16 is provided by a bank of batteries 30 which may be connected in series to provide a voltage of 24 VDC across electrodes 14 and 16.

Electrodes 14 and 16 are replenished by a plurality of actuators which are grouped into anode actuators 32 and cathode actuators 34. Each actuator 32, 34 includes a magazine holding a supply of carbon rods which may be supplied serially in end-to-end fashion through ports 6 and 8 of vessel 12 of reaction chamber 4. The erosion from arcing and combination of carbon molecules with $O_2$ to make CO causes exhaustion of the carbon electrodes 14, 16 and the anode 14 and cathode 16 must be repeatedly advanced toward one another in order to cause arcing and consequent production of $H_2$ gas. Therefore electrodes 14, 16 must be gradually fed into ports 6, 8.

Solar collector panels 40 are disposed about vessel 12 to collect photons emitted during the arcing between cathode 16 and anode 14 within water 20. Vessel 12 is preferably provided with a transparent sidewall 10 to allow transmission of emitted photons efficiently to solar collector panels 40.

Within the internal combustion process of the internal combustion engine, $H_2$ is oxidized to $H_2O$ in vapor form and the CO gas component is oxidized to carbon dioxide. Some of the vaporized $H_2O$ may be condensed at atmospheric temperatures into liquid $H_2O$ which is vented to the reaction chamber 4 to replenish the water 20 therein.

The 24-volt battery bank 30 supplies the initial low voltage to each of the actuators 32, 34. Connected to each of the actuators 32, 34 are gravity fed spring assisted removable magazines that contain fifty carbon rods that are one foot long by 5/8-inch diameter. The actuators 32, 34 include linear actuation devices which propel these carbon rods into a water-filled clear cylindrical acrylic vessel of the reaction chamber 4. A current sensing circuit instructs the linear actuation devices to continue the advance of the rods until an arc is obtained. The arc creates a plasmatic reaction between the carbon rods and the water inside the reaction chamber 4. It is a source of intense photon emissions that is collected by a group of solar collector panels 40 surrounding the reaction chamber 4 used to aid in the replenishment of the battery bank 30.

The reaction chamber water temperature increases significantly during operation. Once a preselected temperature is reached in the water 20 in the reaction chamber 4, the heated water is then pumped to a Stirling engine 58 connected to a low voltage generator, to convert the heat from the water to mechanical energy to generate electricity, adding to the overall efficiency of the electrical system used to charge the battery banks or to aid in the reaction process of creating more gas.

After the reaction has taken place long enough, the clarity of the water changes due to small particles of carbon dispersed throughout the water. The small particles of carbon that are in the water are trapped via a filtration system 42 to be collected as the filter system becomes full. The collected carbon particles may be recycled back into carbon rods by carbon rod manufacturers using the same industrial process used to create rods originally.

The gas generated by the underwater arcing then flows through a one-way valve into a fuel line to a low pressure regulator connected to a modified fuel injection port for fueling any internal combustion engine.

Figure 3:
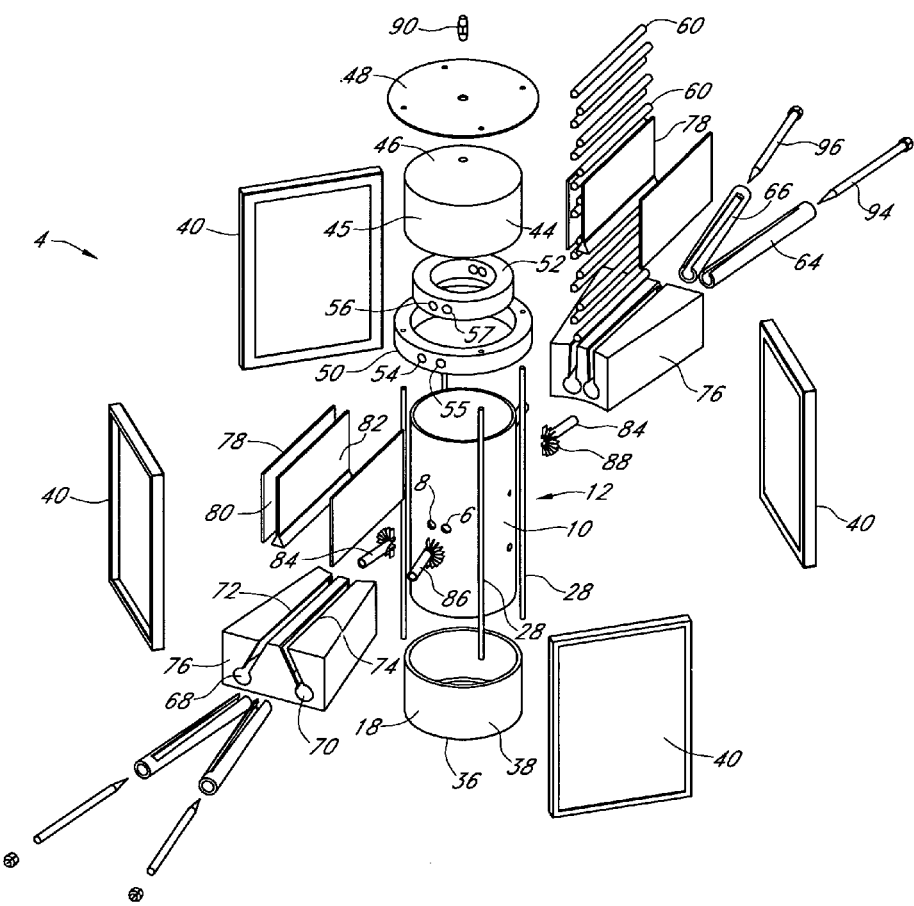
FIG. 3 is an exploded view of the reaction chamber and rod feed mechanisms of the invention.

Referring to FIG. 3, the reaction chamber 4 is shown in exploded view. Reaction chamber 4 comprises vessel 12 which includes cylindrical intermediate sidewall 10 which is constructed of photon transmissive material which in the preferred embodiment is transparent plastic or glass. Vessel 12 includes a base 18 with bottom 36 and transparent cylindrical lower sidewall 38. Intermediate sidewall 10 abuts to and seals with lower sidewall and to cap 44 to make vessel 12 leak proof. Like intermediate sidewall 10 and lower sidewall 38, upper sidewall 45 of cap 44 is substantially transparent. Tie rods 28 retain cap 44, intermediate sidewall 10 and base 18 together as complete, enclosed vessel 12 with top plate 48 thereon. Cap top 46 and bottom 36 of base 18 may be dome shaped. Outer collar 50 is disposed along tie rods 28 such that guide passageways 54, 55 thereof are aligned with ports 8, 6 respectively. Similarly inner guide annulus 52 is positioned such that guide passageways 56, 57 thereof are coaxial with guide passageways 54, 55 of outer collar 50. The passageways of outer collar 50 and inner guide annulus 52 provide openings through which carbon rods 60 pass and guide the paired carbon rods 60 on convergent vectors so that the free ends thereof will be sufficiently proximate so arcing will occur between them when each is charged with a different potential and the power source provides adequate current.

Guide sleeves 64, 66 are disposed within passageways 68, 70 of guide block 76 below guide slots 72, 74 into which carbon rods 60 drop from storage magazine 78. Carbon rods 60 which have dropped into rod guide sleeves 64, 66 from storage magazine 78 are selectively urged toward vessel 12 by linear actuators 94, 96. Magazines 78 may comprise first and second vertical bins 80, 82 which are sized to retain carbon rods 60 in a single vertical row in each bin. Carbon rods 60 are also stored in slots 72 and 74 of guide block 76. As one carbon rod 60 is fed out of a guide sleeve 64, 66 into one of brass sleeves 84, 86, another carbon rod 60 falls into guide sleeve 64 or 66 and is urged toward vessel 12 by linear actuator 94 or 96 depending on which guide sleeve 64, 66 has just been refilled. Linear actuators 94 and 96 are controlled by a controller (not shown) which senses when arcing in vessel 12 has ceased or when either of guide sleeves 64, 66 are empty.

As the linear series of end-to-end carbon rods 60 is urged from guide sleeves 64, 66, each carbon rod enters a conductive brass sleeve 84, 86, each of which extends through one passageway 54, 55 of outer collar 50; through a port 6, 8; and through a passageway 56, 57 of inner annulus 52. The brass sleeves 84, 86 are coupled to voltages at differing potentials with brass sleeves 84 coupled to preferably 24 VDC and brass sleeves 86 coupled to ground or a negative terminal of battery bank 30 (see FIG. 1). As carbon rods 60 pass through brass sleeves 84, 86, an electrical charge is imparted to them such that a carbon rod 60 carried in brass sleeve 84 becomes an anode 14 while extending through sidewall 10 into vessel 12 and similarly a carbon rod 60 present in brass sleeves 86 becomes a cathode 16 while extending into vessel 12. The charges on brass sleeves 84, 86 may be switched or pulsed or varied to achieve arcing between anode 14 and cathode 16 (see FIG. 2) while immersed in water 20. Brass sleeves 84, 86 are provided with heat dissipation fins 88.

Solar panels 40 comprise photovoltaic cells and are disposed about vessel 12 such that photons emitted during arcing between anode 14 and cathode 16 are collected by photovoltaic cells of solar panels 40 and converted to electricity.

Reaction chamber 4 and solar panels 40 may be contained in a housing (not shown).

Fitted into domed top 46 and passing through top plate 48 is collector 90 through which gaseous $H_2$, $O_2$ and other gases generated by the underwater arcing within vessel 12 is ported.

Water in vessel 12 becomes intermixed with carbon particles and other impurities as arcing continues. The water from reaction chamber 4 may be circulated as needed to deplete heat through heat dissipation members such as a radiator or by transferring heat from the water to a Stirling engine which may convert excess heat in the water to mechanical motion. Filtration of the water in the reaction chamber 4 by customary methods is useful to remove the carbon particles which collect in the water in the reaction chamber. The collected carbon can be recycled into carbon rods or other desired carbon containing products.

Figure 4:
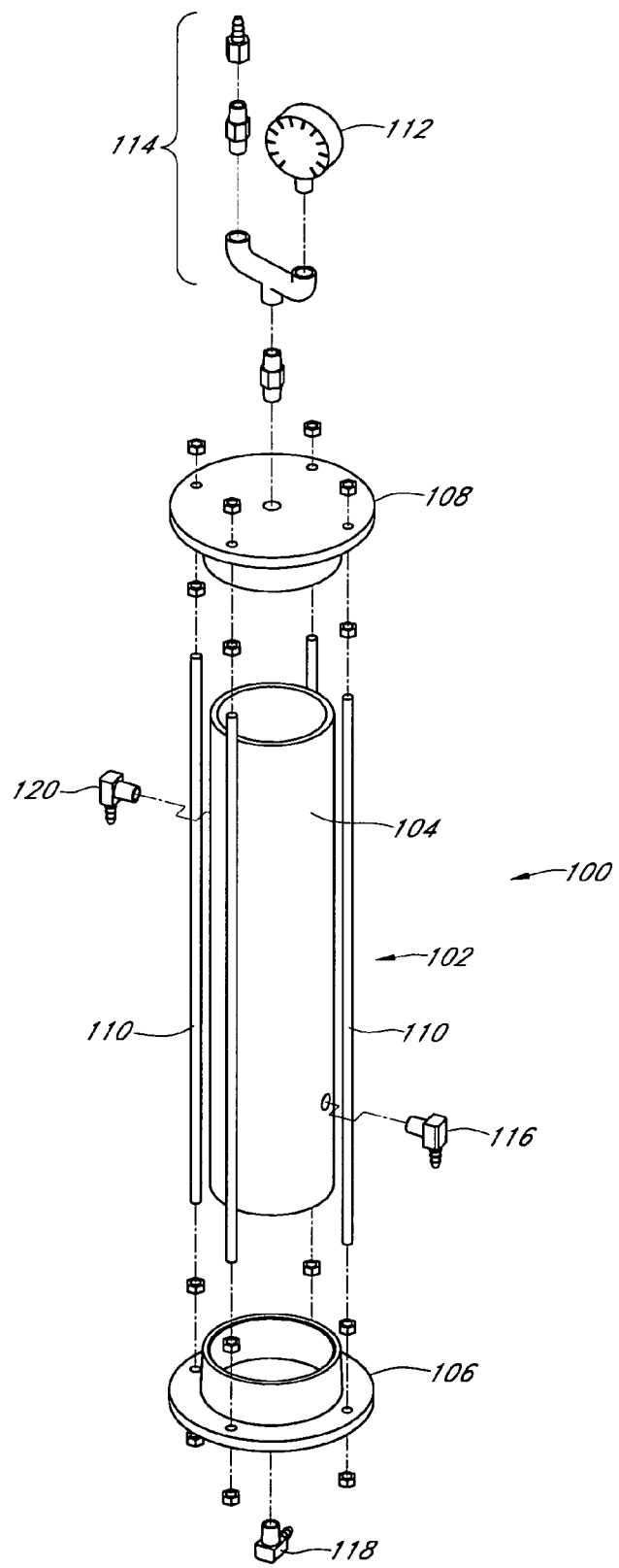
FIG. 4 is an exploded view of a water reservoir for the invention.

Referring now to FIG. 4, an exploded view of a water reservoir 100 used with reaction chamber 4 (see FIG. 3) is illustrated. Water reservoir 100 comprises a tank 102 including a cylindrical sidewall 104 with a bottom 106 and top 108 which are retained to sidewall 104 in watertight fashion by tie rods 110. A pressure gauge 112 may be coupled to the interior of tank 102 to provide indication of the head pressure therein. A port 114 may be associated with gauge 112 such than $H_2$ gas within tank 102 may be ported off for delivery to an internal combustion engine suitably customized to accept $H_2$ as fuel.

Hydrogen gas may be ported to tank 102 from reaction chamber 4 after passing through an algoid filter which is provided with carbon dioxide absorbent filtration elements such that $CO_2$ is filtered out before the gases from reaction chamber 4 are passed into tank 102 through intake fitting 116. $H_2$ and other gases pass through intake fitting 116 into tank 102 which contains water at ambient temperature. The $H_2$ and other gases are cooled as they bubble through the water in tank 102 and collect in the head of tank 102 above the level of the water present in the tank 102. When water in the vessel 12 of reaction chamber 4 becomes depleted, water from tank 102 may be transferred from tank 102 into vessel 112 to maintain the level of water therein sufficiently high that anode 14 and cathode 16 remain immersed. Water may exit or enter tank 102 through fittings 116, 118.

In a preferred embodiment, the reaction conversion chamber 4 holds approximately six gallons of water. This is the reaction environment within the reaction chamber 4. At least two sets of ten-inch carbon rods 60 that have the properties of an anode 14 and a cathode 16 are used. The carbon rods 60 are actuated into the reaction chamber by an electromagnetic linear collar drive through brass sleeves 84, 86 which are approximately one inch shorter than the carbon rods 60. The brass sleeves 84, 86 are covered with fins to help dissipate the heat that is gathered from the reaction.

Arcing between the opposingly charged pairs of carbon rods 60 facilitates the induction of plasma into the reaction environment. Once the plasma exists inside the reaction environment, the use of alternate-pulse width patterns, as well as power and voltage variable modulation, helps to sustain and propagate a plasmatic instance within the reaction environment. This provides the conversion of water by low-voltage electricity into gas at high volume (10 liters per second) and low pressure (approximately 30 psi).

The gas is a mixture of approximately 2% carbon dioxide (+/−1.5%), 70% hydrogen (+/−10%), 20% oxygen (+/−10%) and miscellaneous gases (1.5-2%). This ratio is based on the rate of consumption and purity of the water. Purer water will yield far greater amounts of hydrogen and oxygen and little if any $CO_2$ gas if the gases are routed through an algoid solution used to absorb carbon dioxide.

The plasma reaction creates heat and photonic energy inside the reaction environment. The photonic emissions that are released are extremely bright and are collected by photovoltaic panels which power a high-voltage circuit that helps maintain the charge on the battery as well as helps to power the next cycle of reactions.

Groups of sensors are mounted throughout the reaction chamber to collect data such as water temperature and water pressure. A photometer is utilized to measure the light intensity. Other sensors include a flow meter for measuring gas output in liters per minute and a pressure sensor and transmitter.

All of the system's sensors feed data to a data acquisition system that is directly controlled by an adaptive-controlled programmable logic controller that maintains the system parameters and constantly monitors the system's performance.

The system is modularly constructed and consists of several individual parts which may be arranged in a compact housing which may be carried in a vehicle. Components of the system include the electrical component, the reaction chamber, the carbon rod magazine and drive system, the water reservoir, the filtration system, the cooling system, and logical control components.

The electrical component consists of twelve 24-volt solar panels and twelve high capacity, quick-recharge, 24-volt lithium ion batteries wired in series with a diode and several high discharge capacitors, a relay, and a high-voltage coil.

Energy stored in the batteries and capacitors is passed through the coil to brass sleeves 84, 86 mounted in the reaction chamber 4. Tandem carbon rods 60 passed through these brass sleeves 84, 86 and angled to almost contact each other pick up the charge and cause an intense arc at their confluence. The resulting plasmatic reaction produces an intense light that is captured in the form of photons by solar panels surrounding the chamber. Energy from the panels, in conjunction with energy from an engine's alternator, recharges the batteries/capacitors for the next reaction cycle.

The reaction chamber consists of a transparent, plastic-compound cylinder with sets of brass sleeves mounted through the walls to facilitate the introduction of energized carbon rods to start and maintain a plasmatic reaction necessary for hydrogen production. Additional fittings in the chamber allow water to circulate for cooling and filtering and for hydrogen to exit. The reaction chamber is filled with approximately six gallons (22.5 liters) of distilled water sufficiently to cover the carbon rods extending into the chamber. The carbon rods are arranged in pairs with the rods of each pair at differing potentials and the free ends of the rods within the water are spaced apart properly to permit an electrical arc to take place and be maintained for a predetermined length of time based on consumption needs. The intense ionization of oxygen under these conditions causes an induced plasmatic state, converting the potential energy stored within the oxygen into a very intense burst of photons and heat energy, as well as the release of hydrogen gas. The pressurized hydrogen gas then flows out of the top of the chamber and to the water reservoir for the next step in the process. Because the reaction produces a great deal of heat and small particles of carbon are released into the water, the remaining water is circulated through a filtering and cooling system. This ensures a steady supply of cool, clean water for maximum efficiency. It should be noted that, while the basic design of the chamber itself may vary, the conversion processes described here will remain the same.

The water reservoir is a sealed cylinder filled with water. Fittings in the top, bottom, and sides allow hydrogen to enter and exit and water to circulate. The filtering system may be a standard reservoir-type water filter with a replaceable filter element. The cooling system may be a standard fin-type radiator, cooled by a fan or forced air. Freed hydrogen gas flows under pressure from the top of the reaction chamber to the bottom of the water reservoir. The gas bubbles up through the much cooler water of the reservoir and is cooled in the process. Pressure in the reservoir, caused by a buildup of hydrogen, forces cool water from the reservoir into the reaction chamber where it cools the brass sleeves and carbon rods. The water from the chamber is forced through a hot water line through the radiator to cool again. The water continues from the radiator to the filter where carbon particles and other impurities are filtered out, and is then returned to the reservoir. The cooled hydrogen gas is ported through a one-way valve at the top of the water reservoir, then flows through a reinforced line to the modified intake manifold of a fuel injection system or the carbureted fuel system of an internal combustion engine.

Carbon rods 60 are integral to the operation of the hydrogen generation system. They provide the medium to introduce electrical energy into the water in the reaction chamber 4 and induce a plasmatic reaction for hydrogen production. Because of the arcing between the tips of the carbon rods 60 within the water of the reaction chamber vessel 12, the rods 60 erode and eventually need to be replaced. A modular rod magazine 78 and actuation system solves this problem by providing a large, easily replaceable supply of rods 60 to the reaction chamber 4. A spring-loaded, 200-rod magazine delivers one rod at a time to a rod guide sleeve 64, 66 mounted to the outside of the chamber. The rod 60 is then pushed through a sealed rod guide sleeve 64, 66 into the energized brass sleeve 84, 86 connected to the electrical system. This is accomplished by either a programmable logic controller (PLC)-controlled, linear mechanical drive system, or a PLC-controlled electromagnetic drive system.

Sensors mounted in the drive system sense when the rod guide is becoming empty and trigger the PLC to load and actuate another rod. All of the carbon rods used by the system will be machined and fitted with O-rings to prevent leakage as they enter the water-filled reaction chamber.

Integrated programmable logic controllers connected to sensors throughout the system synchronize system operations.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. An energy conversion apparatus comprising:
    a. an electrical energy source;
    b. a reaction chamber containing a supply of water, wherein a sidewall of said reaction chamber is photon transmissive;
    c. a first anode disposed in said supply of water, wherein said first anode is coupled to said electrical energy source such that said electrical energy source imparts a first potential to said first anode;
    d. a first cathode disposed within said supply of water and proximal to said first anode, wherein said first cathode is coupled to said electrical energy source such that said electrical energy source imparts a second potential to said first cathode, wherein said first anode and said first cathode are selectively adjustably positionable within said supply of water to bring said first anode and said first cathode sufficiently near for arcing to occur between said first anode and said first cathode;
    e. a collector to receive hydrogen escaping from said reaction chamber; and
    f. a photon collector disposed relative and exterior to said reaction chamber, wherein said photon collector includes at least one photovoltaic cell configured to convert kinetic energy from a plurality of photons emitted during the arcing between said first anode and said first cathode to electrical energy, and wherein said photon collector distributes said electrical energy to said electrical energy source.

2. The energy conversion apparatus according to claim 1 wherein both said first anode and said first cathode are further defined as each comprising a series of carbon rods electrically coupled together, a supply of carbon rods supplying each said first anode and said first cathode.

3. The energy conversion apparatus according to claim 1 wherein said reaction chamber is further defined as comprising a transparent sidewall.

4. The energy conversion apparatus according to claim 1 wherein said energy conversion apparatus further comprise a duct, wherein said duct is configured to convey hydrogen in said collector to an intake manifold of an internal combustion engine.

5. The energy conversion apparatus of claim 4 wherein water vapor from an exhaust stream of said internal combustion engine is ducted to the reaction chamber.

6. The energy conversion apparatus of claim 1 wherein said electrical energy source is further defined as comprising an electrical battery.

7. The energy conversion apparatus according to claim 2 further comprising a first carbon rod supply mechanism, said first carbon rod supply mechanism comprising:
    a. a first carbon rod magazine containing a first plurality of carbon rods;
    b. a first electrically charged sleeve penetrating a sidewall of said reaction chamber; and
    c. a drive mechanism configured to urge a carbon rod from said first carbon rod magazine into said first electrically charged sleeve, wherein said first carbon rod supply mechanism supplies said first anode.

8. The energy conversion apparatus according to claim 7 further comprising a second carbon rod supply mechanism, said second carbon rod supply mechanism comprising:
    a. a second carbon rod magazine containing a second plurality of carbon rods;

b. a second electrically charged sleeve penetrating a sidewall of said reaction chamber; and c. a drive mechanism configured to urge a carbon rod from said second carbon rod magazine into said second electrically charged sleeve, wherein said second carbon rod supply mechanism supplies said first cathode.

9. The energy conversion apparatus according to claim 2 further comprising a second anode disposed in said supply of water, wherein said second anode is coupled to said electrical energy source such that said electrical energy source imparts a third potential to said second anode.

10. The energy conversion apparatus according to claim 9 further comprising a second cathode disposed in said supply of water, wherein said second cathode is coupled to said electrical energy source such that said electrical energy source imparts a fourth potential to said second cathode.

11. The energy conversion apparatus according to claim 1 wherein said first anode is further defined as being a first carbon rod, wherein said first carbon rod is positioned in an electrically charged sleeve of said first carbon rod supply mechanism, said carbon rod supply mechanism comprising:

a. a carbon rod magazine;

b. a plurality of carbon rods disposed in said carbon rod magazine; and, c. a drive mechanism mechanically engaged with a second carbon rod of said plurality, wherein said drive mechanism is configured to urge said second carbon rod into said electrically charged sleeve, thereby displacing said first carbon rod.

12. An energy conversion apparatus comprising:

a. an electrical energy source;

b. a reaction chamber containing a supply of water, wherein a sidewall of said reaction chamber is photon transmissive;

c. a first anode supply mechanism having a plurality of carbon rods positioned therein, wherein said first anode supply mechanism disposes a first carbon rod of said plurality in said supply of water, wherein said first carbon rod is coupled to said electrical energy source such that said electrical energy source imparts a first potential to said first carbon rod;

d. a first cathode supply mechanism having a second plurality of carbon rods positioned therein, wherein said first cathode supply mechanism disposes a second carbon rod of said second plurality in said supply of water and proximal to said first carbon rod, wherein said second carbon rod is coupled to said electrical energy source such that said electrical energy source imparts a second potential to said second carbon rod, wherein said first carbon rod and said second carbon rod are selectively adjustably positionable within said supply of water to bring said first carbon rod and said second carbon rod sufficiently near for arcing to occur between said first and second carbon rods;

e. a collector to receive hydrogen escaping from said reaction chamber; and f. a photon collector disposed relative and exterior to said reaction chamber, wherein said photon collector includes at least one photovoltaic cell configured to convert a portion of kinetic energy from a plurality of photons emitted during the arcing between said first anode and said first cathode to electrical energy, and wherein said photon collector distributes said electrical energy to said electrical energy source.

* * * * *